April 24, 1934.  G. B. MARZOLF  1,955,969
LATCHING DEVICE
Filed July 30, 1932
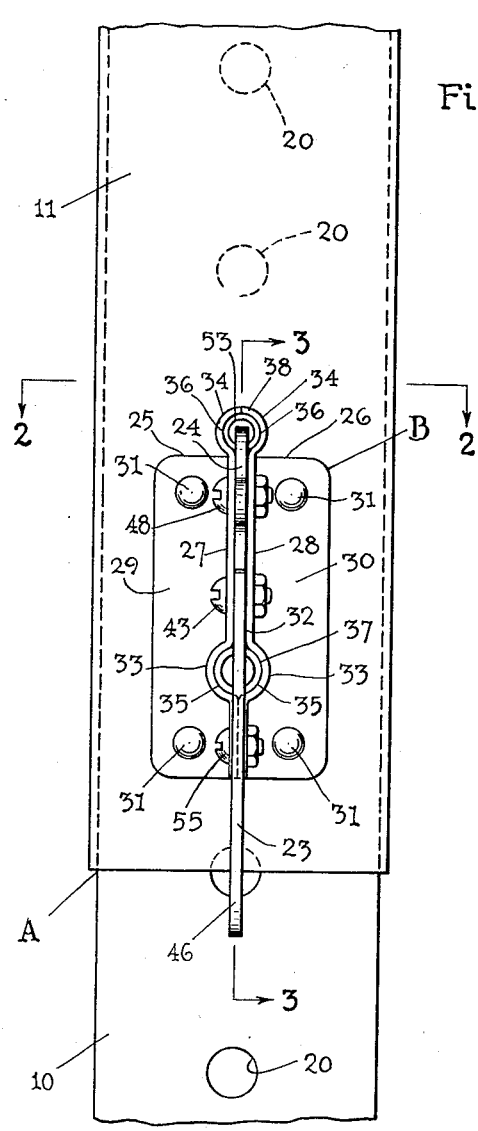
Inventor
George B. Marzolf
By Caswell & Lagnard
Attorneys Patented Apr. 24, 1934

1,955,969

UNITED STATES PATENT OFFICE 1,955,969

LATCHING DEVICE

George B. Marzolf, St. Paul, Minn., assignor to Farwell Ozmun Kirk & Co., St. Paul, Minn., a corporation of Minnesota Application July 30, 1932, Serial No. 626,951

8 Claims. (Cl. 287—58)

My invention relates to locking devices and has for its object to provide a locking device which may be used for holding sliding parts from movement, such as the component parts of the telescoping legs of a tripod or a scaffold support.

An object of the invention resides in providing a locking device constructed principally from sheet metal stampings.

A still further object of the invention resides in providing a locking device including a mounting having a bolt slidable relative thereto and in providing a lever pivoted to the mounting and having a finger for engagement with the bolt.

An object of the invention resides in providing a handle issuing outwardly from said lever and extending in a direction at right angles to the bolt.

Another object of the invention resides in constructing the mounting elongated and in arranging the guideway for the bolt crosswise of the mounting.

A feature of the invention resides in constructing the lever so that the handle thereon extends in the same direction as said mounting and in so arranging the parts that the handle overlies the mounting when the bolt is in bolted position.

An object of the invention resides in constructing the mounting of two juxtaposed parts, said parts having facing grooves therein forming a bore or guideway for the bolt and said parts being spaced to provide a slot therebetween for the reception of the lever.

A still further object of the invention resides in providing a pawl for engagement with said lever to hold the bolt in bolted position and in disposing the pawl in said slot.

A feature of the invention resides in forming a shoulder on the lever with which the pawl engages.

A still further object of the invention resides in constructing the mounting with another set of grooves forming a second bore and in providing within said bore a coil spring for engagement with the pawl.

A feature of the invention resides in constructing the pawl with a finger piece issuing outwardly therefrom on the same side of the mounting as the lever.

An object of the invention resides in constructing the parts of the mounting with flanges and in stamping the flanges in such a manner as to form pairs of facing grooves to provide the bores of the invention.

A still further object of the invention resides in forming the parts of the mounting with plates issuing outwardly from said flanges and lying in a common plane to form a base for attaching the mounting to the object with which it is to be used.

Another object of the invention resides in providing a finger on the lever for engagement with the bolt, said finger extending in a radial direction from the pivot of said lever and in further arranging the handle in offset parallel relation with respect to said finger.

Other objects of the invention reside in the novel combination and arrangement of parts and in the details of construction hereinafter illustrated and/or described.

In the drawing:

Fig. 1 is an elevational view of a locking device illustrating an embodiment of my invention.

Fig. 2 is a cross sectional view taken on line 2—2 of Fig. 1.

Fig. 3 is an elevational sectional view taken on line 3—3 of Fig. 1.

Fig. 4 is a side elevational sectional view taken on line 3—3 of Fig. 1.

My invention may be used for locking any of two relatively slidable parts and is particularly useful in holding the sections or telescoping members of the legs or supports of a tripod or scaffold in adjusted position. In order to illustrate the application of my invention, I have shown in the drawing a leg A of a tripod which in the particular illustration is shown as being channel shaped in cross section. This leg comprises an inner section 10 and an outer section 11 adapted to envelop the inner section. The section 10 consists of a web 12 and two flanges 13 and 14 issuing outwardly therefrom. The section 11 is similarly constructed with a web 15 and two flanges 16 and 17. The flanges 16 and 17 are provided with inwardly turned lips 18 and 19 which overlie the flanges 13 and 14 of section 10 and which hold the parts in assembled relation. The various parts are sufficiently loosely constructed so that the two members may slide relative to one another and procure telescoping of the sections of the leg. The member 10 is constructed with a number of openings 20 which are formed by stamping the metal of the web 12 of member 10, as best shown in Fig. 3 in a manner to provide a lip 21 encircling said opening by means of which a sufficient bearing surface is provided for engagement with the bolt of the locking device so that the parts may be rigidly and securely held from movement and so that excessive wear is prevented.

The locking device proper consists of a mounting indicated in its entirety at B which has slidably mounted in it a bolt 22 adapted to engage any of the holes 20 in the member 10. Mounting B further has pivoted to it a lever 23 for operating the bolt 22 and a pawl 24 adapted to latch the lever 23 when the bolt is in bolted position and to restrain movement thereof. These parts will now be described in detail.

The mounting B is constructed in two parts, said parts being indicated in their entireties by the reference characters 25 and 26. These parts are preferably formed of sheet metal and are stamped to provide two flanges 27 and 28 and two plates 29 and 30 which issue outwardly therefrom at right angles to said flanges and which form base members by means of which the mounting may be attached to the structure on which it is supported. The mounting B is mounted upon the web 15 of the member 11 and is secured thereto through four rivets 31, which pass through the base members 29 and 30 and through the web 15 of member 11. These rivets are preferably counter-sunk on the inner surface of web 15 so as to permit the two members 10 and 11 to slide freely relative to one another. In the arrangement of the two parts 25 and 26 the flanges 27 and 28 are spaced from one another to leave a slot 32 between said member. The two flanges 27 and 28 are further pressed outwardly, as designated at 33 and 34 to form facing grooves 35 and 36 which in conjunction with one another provide bores 37 and 38 extending transversely through the mounting B near the two ends thereof. An opening 58 in the web 15 is concentric with bore 37.

The bolt 22, as best shown in Fig. 3, is tubular in form being constructed with a bore 39 within the same. This bolt is further constructed with a rounded end 40 by means of which the bolt may be readily inserted into any of the openings 20. The bolt 39 may be constructed from sheet metal stamped in the desired form and the rounded portion 40 at the end thereof constructed by forcing inwardly toward one another sector-shaped lugs on the end of the stamping to form a composite structure, as illustrated. The bolt 22 may, however, be constructed in any other suitable manner. The bore 37 in the mounting B serves as a guide and supports the bolt 22 for sliding movement through the opening 58 and toward and from the web 12 of the member 10 of the tripod or scaffold support. When the bolt 22 is forced inwardly, the same may engage any of the holes 20 as shown in Fig. 3 holding the two members 10 and 11 from movement relative to one another.

For operating the bolt 22 the lever 23 is employed. This lever is stamped from sheet metal of a thickness substantially equal to the width of the slot 32 formed between the two flanges 27 and 28 of the parts of the mounting B. This lever is constructed with a head 42 which is disposed between the flanges 27 and 28 and which is pivoted to the mounting through a short bolt 43 which passes through the two flanges 27 and 28 and said head. The lever 23 is further constructed with a finger 44 which extends radially outwardly from the head 42 and which passes through an opening 45 in the wall of the bolt 22 and extends into the bore 39 of the bolt. As the lever 23 is rotated finger 44 engages the edges of the wall of the bolt formed by the opening 45 and causes reciprocating movement of the said bolt along the guideway 37 in a direction toward and from the web 12 of member 10.

The lever 23 is further provided with a handle 46 which issues outwardly from the head 42 of said lever, said handle extending in a direction substantially parallel to the finger 44 and offset with respect thereto. The head 42 is of such dimensions that the said head and finger 44 are confined within the slot 32 while the handle 46 is so constructed that the same extends substantially without the mounting where the same may be readily grasped by the operator and manipulated, as desired. When the bolt is in bolted position, as shown in Fig. 3, handle 46 lies parallel to and along the longitudinal edges of the flanges 27 and 28 where the same is out of the way. When the handle 46 is drawn outwardly, finger 44 is moved in a direction away from the base of the mounting, causing the bolt 22 to be withdrawn from engagement with the hole 20 in the web 10. The position of the parts when the bolt has been fully withdrawn is shown in Fig. 4 in which the bolt projects outwardly of the mounting B and the handle 46 is disposed at an angle with respect thereto.

In order to restrain movement of the bolt 22 when the same is in bolted position the pawl 24 is employed which is best shown in Figs. 3 and 4. This pawl is also constructed of sheet metal the same as lever 23 and consists of a head 47 which lies in the slot 32 and which is pivoted to the mounting through a short bolt 48 similar to the bolt 43, said bolt extending jointly through the two flanges 27 and 28 and said head. The pawl 24 further includes a lug 49 which extends outwardly from said head and which is adapted to engage a shoulder 50 formed on the end of the handle 46 adjacent the head 42 of lever 23. The pawl 24 may be swung in such a direction that the lug 48 is disengaged from shoulder 50 permitting lever 23 to be moved from the position shown in Fig. 3 to that shown in Fig. 4. When so disengaged, lug 49 rides along a cam surface 51 of handle 46 leading up to the shoulder 50. The pawl 24 may be manipulated through a finger piece 52 which issues from the head 47 thereof and extends outwardly beyond the mounting B where the same is readily accessible.

The pawl 24 is normally urged to move in a direction such that the lug 49 is brought into engagement with the shoulder 50 when the lever 23 is in proper position. This is accomplished through a compression coil spring 53 which is disposed within the bore 38 of mounting B and which engages an arm 54 issuing outwardly from the head 47 of pawl 24. The arm 54 extends into the bore 38 where the same engages the spring 53 which moves the pawl 24 in a direction urging lug 49 into engagement with the lever 23. From an inspection of Fig. 3 it will be noted that the lug 49 engages the cam surface 51 of lever 23 at such a locality that the said lug acts to swing the lever so as to move the bolt into bolting position. By means of this construction the spring 53 not only holds the pawl in engagement with the lever, but also operates to move the bolt into bolting position. When the lever 23 passes the shoulder 50, lug 49 drops into a notch 57 formed in said lever adjacent shoulder 50 and thereafter holds the lever from further movement, said lug being urged into such position through the spring 53.

The two bolts 48 and 43 serve to hold the two flanges 27 and 28 in proper relation and prevent spreading thereof. To further assist in holding these plates rigidly in place another bolt 55 is employed which passes through the ends of the flanges 27 and 28 adjacent the portions 33 and 34 thereof. These ends abut one another and in this manner serve to hold the two flanges the proper distance apart to permit free movement of the lever 23 and pawl 24. Likewise the portions 34 abut one another and hold the flanges properly spaced.

The operation of the device when applied to a scaffold support or the leg of a tripod is as follows: In normally bolted position the bolt 22 extends into one of the openings 20 of the web 12 of member 10, thus locking the two members 10 and 11 from relative movement. When it is desired to shift the position of the members relative to one another the fingers are placed under the lever 46 and the thumb is placed upon the thumb piece 52. The thumb piece 52 is first forced away from lever 23 causing lug 49 to be disengaged from shoulder 50. After disengagement of the lug 49 from shoulder 50 the handle 46 may be swung outwardly as shown in Fig. 4. The bolt 22 is then disengaged from the opening 20 and the two parts of the scaffold or tripod may be shifted relative to one another. Upon releasing the handle 46 and thumb piece 52 the end 40 of bolt 22 is caused to ride upon the cam surface 59 of the web 12. As soon as the bolt comes opposite one of the holes 20, spring 53 exerts pressure upon the pawl 24 which through engagement of lug 49 with cam surface 51 moves the lever 23 into the position shown in Fig. 3, bringing the bolt 22 into engagement with the opening 20. The device is then in proper bolting position. As soon as the lug 49 passes shoulder 50 the lever 23 is again latched from movement and the bolt held in bolted position.

The invention is highly meritorious in that an exceedingly simple and effective device is provided whereby sliding parts may be held rigidly attached in adjusted position. The device may be constructed from sheet metal and at an extremely low cost. All of the parts can be constructed of sufficient strength to easily withstand the stresses applied to them. The device is easy to manipulate and positive in action. Great accuracy in the manufacture of the device is not required and the device will operate equally as effectively even if the parts are roughly made. The device is neat in appearance and the parts, though readily accessible, are out of the way when the bolt is in locking position.

Changes in the specific form of my invention, as herein disclosed, may be made within the scope of what is claimed without departing from the spirit of my invention.

Having described my invention, what I claim as new and desire to protect by Letters Patent is:

1. A locking device comprising a mounting having two parallel bores, one thereof forming a guide, a bolt slidable in said guide, a lever pivoted to said mounting and engaging said bolt, a pawl pivoted to said mounting and engaging said lever for restraining movement thereof and a spring in the other bore, seated against said mounting and against said pawl for urging the pawl into engagement with the lever.

2. A locking device comprising a mounting formed with two juxtaposed parts, each having a flange and a plate connected therewith, said parts being arranged with the flanges thereof in spaced relation to form a slot therebetween and with the plates disposed in a common plane to form a base, said flanges being constructed with facing grooves to provide a guideway, a bolt slidable along said guideway and a lever disposed in said slot and pivoted to said flanges and engaging said bolt for sliding the same along said guideway.

3. A locking device comprising a mounting formed with two juxtaposed parts, each having a flange and a plate connected therewith, said parts being arranged with the flanges thereof in spaced relation to form a slot therebetween and with the plates disposed in a common plane to form a base, said flanges being constructed with two pair of facing grooves to form a guideway and a housing, spaced from one another, a bolt slidable along said guideway, a lever disposed between said flanges and adjacent said guideway and engaging said bolt, a pawl disposed between said flanges and adjacent said housing and having latching means for engagement with said lever and a spring in said housing seated against said pawl for urging the latching means into engagement with said lever.

4. A locking device comprising a mounting having a guideway, a bolt slidable along said guideway, a lever pivoted to said mounting at a locality intermediate the ends of the guideway and to one side thereof, said lever having a finger extending radially therefrom and engaging said bolt and an arm extending substantially parallel to said finger and in offset relation with respect thereto, a shoulder formed on said arm at the pivoted end of the lever and a pawl pivoted to said mounting for engagement with said shoulder.

5. A locking device comprising two members spaced to provide a slot therebetween and formed with a guideway, a bolt slidable along said guideway, a lever disposed within said slot and engaging said bolt, a pawl disposed within said slot and engaging said lever, a handle formed on said lever and disposed without the slot and mounting and issuing from said lever on one side of said mounting and a finger piece on said pawl disposed without said slot and issuing from the pawl on the same side of the mounting as said lever.

6. In a locking device, a mounting including a pair of flanges arranged in spaced relation to form a slot therebetween, said flanges being constructed with a pair of facing grooves to form a guideway, a bolt slidable along said guideway, a lever disposed between said flanges and engaging said bolt, a pawl also disposed between said flanges for latching said lever in bolt locking position, and a spring, supported partly at least by one of said flanges, acting against said pawl to urge the same into latching engagement with said lever.

7. A latching device for adjustably locking telescopic leg members relative to one another, said device including a bolt adapted to be shifted through an opening in one leg member and to be inserted into any of a number of openings in the second leg member, a mounting applicable to the first leg member for slidably supporting said bolt, a lever pivoted to said mounting and cooperating with said bolt to shift the same, said lever being formed with a shoulder thereon and having a handle adapted to be swung into depending relation in the shifting of said bolt into locking position, a pawl pivoted on said mounting in position superimposing said lever, said pawl being adapted to swing downwardly into engagement with said shoulder, in the bolt locking position of said lever, to latch the same against retraction from such position, the said disposition of said pawl and handle preventing the accidental unlocking of the leg members as from impacts against the locking device by falling objects.

8. A device of the character described comprising a mounting, a bolt slidable therein, a lever pivoted to said mounting and cooperating with said bolt to shift the same, said lever being formed with a cam surface thereon and a shoulder, and a spring pressed pawl on said mounting engaging said lever, said pawl cooperating with said cam surface to swing said lever into bolt locking position and cooperating with said shoulder, in said bolt locking position of said lever, to latch said lever in such position.

GEORGE B. MARZOLF.